N. ELMER.
Sulky-Plow.

No. 200,650. Patented Feb. 26, 1878.

Witnesses.
F. J. Sovereign
A. D. Behel

Inventor
Nathan Elmer
Per Jacob Behel
Atty

N. ELMER.
Sulky-Plow.

No. 200,650.  Patented Feb. 26, 1878.

Witnesses.
F. J. Sovereign.
A. O. Behel.

Inventor.
Nathan Elmer.
Per. Jacob Behel.
Atty.

4 Sheets—Sheet 3.
N. ELMER.
Sulky-Plow.
No. 200,650. Patented Feb. 26, 1878.
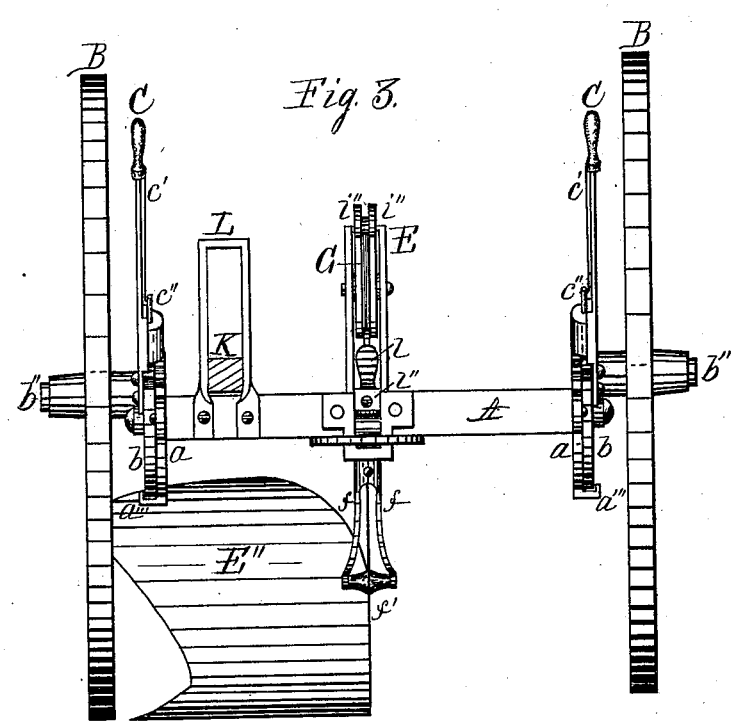
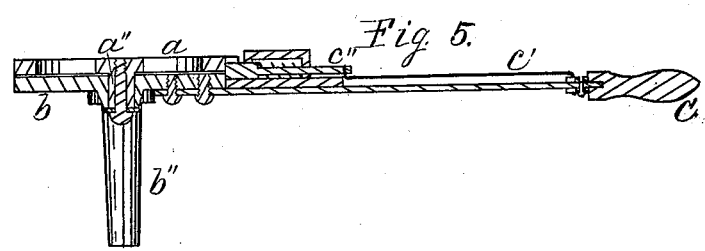
Witnesses.
F. J. Sovereign.
L. O. Behel.
Inventor.
Nathan Elmer.
Per. Jacob Behel.
Atty.

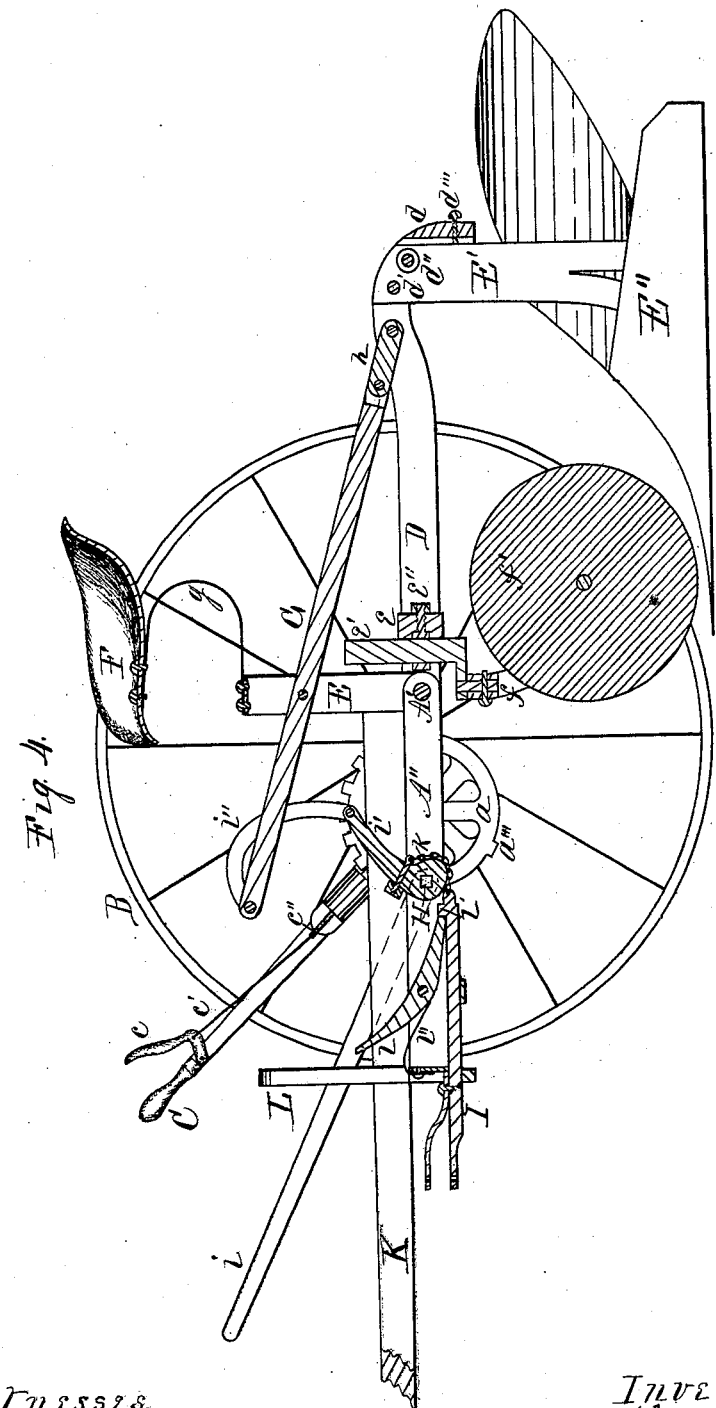

UNITED STATES PATENT OFFICE.

NATHAN ELMER, OF FREEPORT, ILLINOIS.

IMPROVEMENT IN SULKY-PLOWS.

Specification forming part of Letters Patent No. 200,650, dated February 26, 1878; application filed November 6, 1877.

*To all whom it may concern:*

Be it known that I, NATHAN ELMER, of the city of Freeport, in the county of Stephenson and State of Illinois, have invented a new and useful Improvement in Sulky-Plows, of which the following is a specification:

This invention relates to that class of plows known as "sulky-plows," in which the plow is connected by its beam to the frame or axle of a carriage mounted on carrying-wheels, and the team is connected to a draw-bar connected to a system of levers, which are connected to the frame and the plow, by means of which the team may be employed to raise the plow out of the ground and lock it in a suspended position for transportation.

The object of my invention is to improve this class of plows, to make them more efficient, and to produce an implement of reliable construction at a reduced cost. To this end I have invented, designed, and constructed the machine represented in the accompanying drawings, in which—

Figure 1:
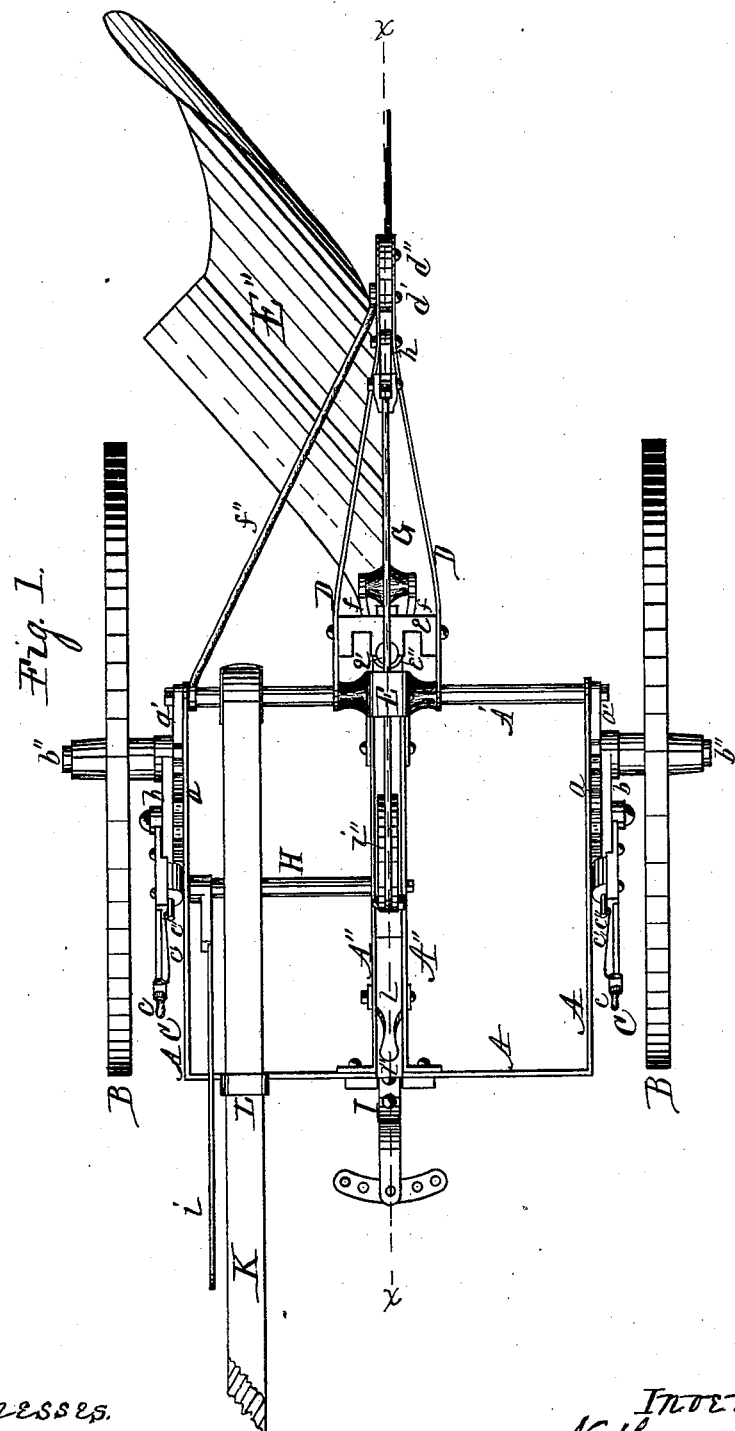
Figure 2:
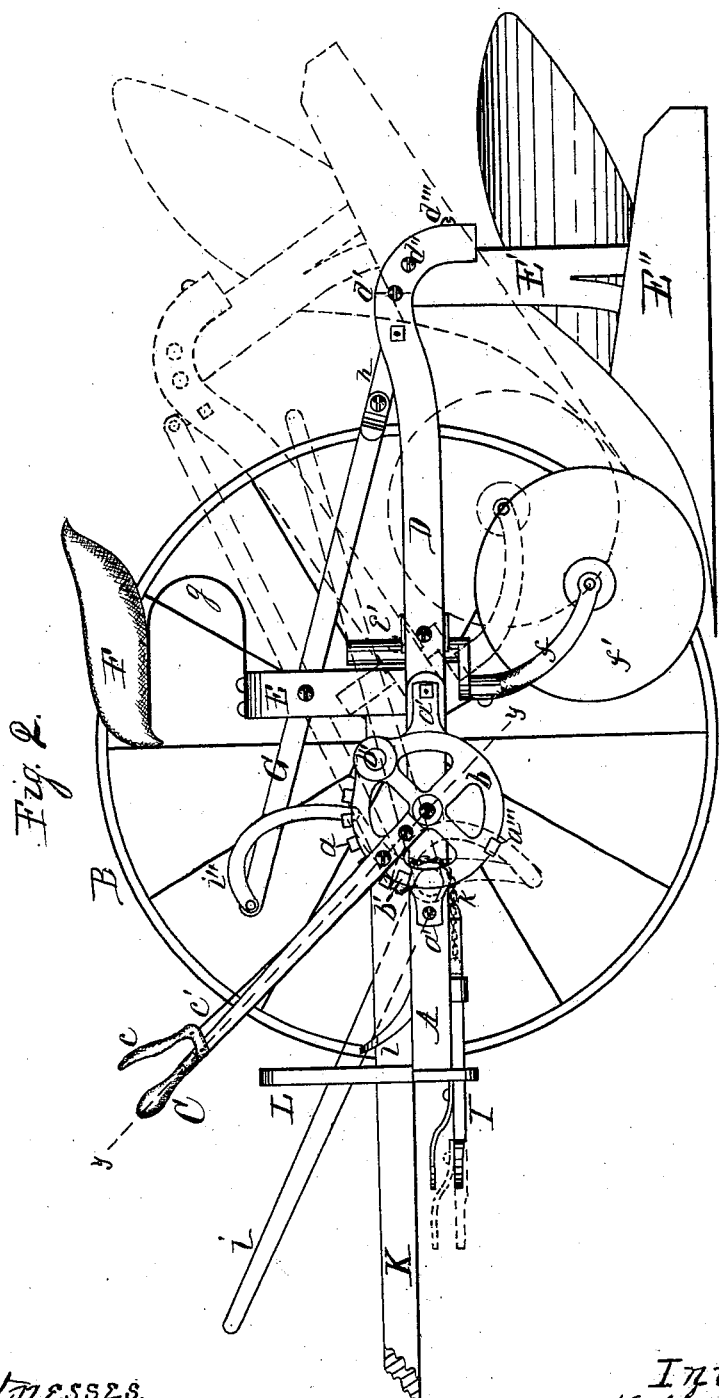

Figure 1 is a plan view of my improved sulky-plow, in which the driver's seat is omitted. Fig. 2 is a side elevation, in which the near carrying-wheel is omitted. Fig. 3 is a front end elevation, and Fig. 4 is a lengthwise vertical central section on dotted line $x$ in Fig. 1. Fig. 5 is a detached sectional view of the ratchet-adjusting device on dotted line $y$, Fig. 2.

In the figures, A represents an iron bar, rectangular in cross-section, bent into the form represented, forming three sides of a rectangular frame, which are connected at their rear ends by a round bar, A′, which completes the rectangular frame. The forward and rear bars of this frame are connected centrally by parallel lengthwise-bars A″ secured thereto. These parts constitute the main frame. $a$ represents ratchets of plate-ring form, constructed with central cross-arms, and on opposite sides with outward-projecting ears $a'$, by which they are secured with sufficient screw-bolts to the outsides and rear portions of the side bars of the main frame. These ratchet plate-rings are constructed with ratchet-teeth on their upper edges, forming a segment-ratchet on each side of the main frame, and are constructed with a central tubular hub, $a''$, projecting from the center of the cross-arms outward. The lower edges of these ratchet plate-rings are constructed with a hooking-lip, $a'''$, designed to overlap a similar plate-ring, $b$, to hold it in contact with the ratchet plate-ring $a$. The plate-rings $b$ are constructed with inner cross-arms and a central hub, bored to receive the tubular hub $a''$. The outer edges of these plate-rings are provided with a notch (represented at $b'$) of proper dimensions to permit the hooking-lip $a'''$ to pass outward through it when being placed in position in the ratchet plate-rings, and when in place can be turned under the hooking-lips, which, in connection with sufficient screw-bolts passed through their tubular centers, serve to hold the plate-rings $b$ to the ratchet-rings in such a manner as to permit them to oscillate on their centers. The plate-rings $b$ are constructed with axle-arms $b''$, which project from their outer rims at right angles to the plane of their face.

B represents carrying-wheels of ordinary construction, fitted to secure and revolve on the axle-arms and support the carriage. C represents levers fixed to the plate-rings $b$, and provided near their handle ends with pivoted thumb-levers $c$, connected by links $c'$ to spring-bolts $c''$, which engage the teeth in ratchet plate-rings $a$, and serve to impart an oscillatory movement to the plate-ring $b$, by means of which the main frame on either or both sides can be raised or lowered to level the carriage and the plow thereto attached to regulate its working depth, and to hold them in their adjusted position.

The plow-beam in this instance is composed of two bars, D, curved downward at their rear ends, at which point a block, $d$, is placed between them vertically, to which they are firmly secured, forming a vertical opening between the bars forming the beam, to admit the upper end of the standard E′ of the plow E″, between which it is pivoted on a pivot clamping-bolt, $d'$, being passed transversely through the beam and standard.

$d''$ is a clamping-bolt, which is also passed transversely through the beam and standard, and is employed to give greater security to the fastening to hold the plow in line.

The hole in the standard to receive the clamping-bolt is enlarged to permit of a limited backward and forward swinging movement of the plow for the purpose of raising or lowering its point, to cause it to work at a greater or less depth. This adjustment is accomplished by means of the set-screw $d'''$, which is placed in the block $d$ near its lower end, and operating against the rear edge of the standard, which, if turned in, will cause the point of the plow to rise, and if withdrawn will permit it to sink, and when adjusted can be held in position by the clamping-bolts $d'$ and $d''$.

The bars D composing the plow-beam, as they extend forward of the standard, diverge, and at their forward ends are bored to receive the rear end bar of the main frame, forming a bracing-beam hinged to the main frame, capable of an up-and-down movement of the plow secured to its rear end.

$f''$ is a brace-rod hinged to the rear end bar of the main frame, and secured at its rear end to the plow-beam toward its rear end, for the purpose of giving additional firmness to the plow-beam laterally. These bars, which form the plow-beam, are connected rearward of the main frame by a cross-bar, $e$, secured in place between the bars by sufficient screw-bolts. Its forward edge is formed with a vertical semicircular groove, to receive the vertical portion of the crank-shaft $e'$ of the rolling colter, which is held in place in the groove by a screw-eyebolt, $e''$, which encircles the shaft, and its screw-threaded shank passes rearward through the cross-bar $e$, and by means of a screw-nut clamps the shaft to the cross-bar. When the shaft $e'$ is in place the crank-arm on its lower end lines forward of the shaft, and the yoke $f$ of the rolling colter $f'$ is swiveled at its upper end on the wrist-pin, depending from the forward end of the crank-arm, and is limited in its vibrations by a pin passing through a transverse slot in the yoke and through the wrist-pin.

From the foregoing it will be seen that if the screw-eyebolt is loosened the shaft $e'$, and the colter thereto attached, may be raised or lowered, to cut more or less in depth, and by turning the shaft to the right or left the colter will be carried with the movement of the crank-arm, to adjust it in line with the plow, and when adjusted can be fixed in position by means of the screw-eyebolt.

E represents the seat-supporting frame, consisting of a suitable bar, bent at its upper end at two points, forming two right angles, and the bar forming three sides of a rectangle, with the space between the vertical bars sufficient to permit their lower ends to embrace the central bars $A''$ of the main frame. The vertical bars of the seat-frame are bent at their lower ends, forming angle-arms, which project forward parallel with the center bars $A''$ of the main frame, and are bored at their angles to receive the rear end bar of the main frame. The forward-projecting arms are bolted to central bars $A''$, which gives firmness to the seat-frame.

F is a seat of the usual form, mounted on the curved spring $g$, secured to the upper cross-bar of the seat-frame. G is a locking and lifting lever, pivoted between the vertical portions of the seat-frame, and to its rear end is pivoted a link, $h$, the rear end of which is pivoted between the bars D, (which form the plow-beam,) forward of the plow-standard. These parts are so arranged with relation to the plow that when it is lowered in working position the center of the joint formed between the rear end of the lever G and the forward end of the link $h$ will be slightly below a line drawn from the center of the pivot in the seat-frame to the center of the pivot in the plow-beam on which the lever and link are pivoted, which forms a lock for the purpose of rendering the plow-beam D vertically rigid with the main frame.

H is a rock-shaft fitted in bearings in the main frame, provided with a hand-lever, $i$, on its outer end, inside of the frame, and its inner end, between the center-bars of the main frame, is provided with a curved arm, $i'$, which curves upward and rearward when the hand-lever $i$ is thrown forward in the position represented in solid lines. The free end of the curved arm $i'$ is connected to the free end of the lever G by curved links $i''$ pivoted thereto.

From the foregoing it will be seen that, in changing the hand-lever $i$ from the position represented in solid lines at the front end of the machine (in Fig. 2) to the position rearward (represented in dotted lines,) its first action will cause the rear end of the lever G to rise, which will break the lock at its connection with the link $h$, and the continued movement of the lever will raise the plow to the position represented in dotted lines, when the points of connection of the curved links $i''$ with the lever G and the curved arm $i'$ will be forward of the center of the rock-shaft, which produces a lock to hold the plow elevated for turning the machine or for transportation. From this position it can be released and the plow lowered and locked in working position by the forward movement of the hand-lever $i$.

I represents a draw-bar having its forward end made in clevis form, to receive the evener to which the team is to be attached, and is provided with a series of holes for the lateral adjustment of the evener, to cause the plow to run more or less to the land-side, and to adapt the machine to work plows cutting furrows differing in width. This draw-bar is fitted to slide lengthwise under the center bars $A''$ in guide-loops secured to the main frame, and a chain, $k$, is connected to its rear end, which passes round the under side of the eccentric or cam-formed hub of the curved arm $i'$, and is connected to its rear edge above the center of its connection with the rock-shaft.

$l$ is a foot-lever spring-pawl pivoted between the center bars of the main frame forward of the rock-shaft. Its forward end engages a prominence, $l'$, on the draw-bar, with which it is held in connection by the action of the spring $l''$. The operator with his foot can depress the forward end of this lever spring-pawl, and disengage it from the draw-bar to permit it to slide forward by the action of the team.

This arrangement of the forward movement of the draw-bar operating on the curved arm by its chain-connection passing round its eccentric hub, will cause the rock-shaft to turn in its bearings, and the parts connected with it will move into the positions represented in the dotted lines in Fig. 2, when the plow will be locked in its elevated position for the purpose of turning the machine or for transportation. The operation of these parts to raise the plow in connection with the forward movement of the draw-bar by the power of the team thereto attached is, in every particular, the same as when performed by the hand-lever $i$. The eccentric form of the hub of the curved arm $i'$, round which the chain from the draw-bar passes to its connection with the rear edge of the curved arm, gives the team the advantage of leverage in the first effort to raise the plow. This operation of raising the plow may be performed by the joint action of the operator and the team by means of the forward-moving draw-bar I and the hand-lever $i$, operating through the same devices and in the same manner.

K represents the rear portion of the tongue or pole, which is connected at its rear end to the rear cross-bar of the main frame by a hinge-joint, to permit of a free vertical movement of the forward end of the tongue, which movement is limited by the staple-formed guideways L, fitted to overspan the tongue, and have their lower ends secured to the forward cross-bar of the main frame.

I claim as my invention—

1. The combination, with the plow-standard, of a diverging plow-beam constructed with downwardly-projecting rear end, between the plates of which the standard is pivoted, the lower rear portion of said beam serving as a stop to limit the movement of the plow-standard, substantially as described.

2. The combination, with a plow-standard, of a diverging plow-beam constructed with downwardly-projecting rear end, between the plates of which the standard is pivoted, the lower rear portion of said beam provided with a set-screw for adjusting the position of the plow, substantially as described.

3. The combination, with a vertically-adjustable main frame, of the diverging plow-beam, braced at its forward end by a cross-bar, and having the plow-standard pivoted between the plates of its rear end, said beam constructed with a downward rear projection, which serves as a stop to limit the movement of the plow, substantially as described.

4. The combination, with the diverging bars of the plow-beam and cross-bar located between said bars, of a vertical colter-shaft, provided with a crank on its lower end, to which is pivoted the yoke of a rolling colter, and a screw-eyebolt engaging with the cross-bar and vertical colter-shaft, whereby the rolling colter may be adjusted either vertically or laterally, substantially as and for the purpose described.

5. The rock-shaft journaled in the main frame, and provided at one end with a hand-lever, $i$, and at the other end with a curved arm, $i'$, in combination with the locking and lifting lever G, which is pivoted to the seat-support, link connecting the rear end of the lifting-lever with the plow-beam, and curved link $i''$, connecting the lever G with the curved arm $i'$, substantially as described.

6. The combination, with the curved arm $i'$, rock-shaft, lever G, and curved link $i''$, of the draw-bar, constructed and arranged substantially as described, whereby the power of the team may be employed to raise and lock the plow, substantially as described.

7. The combination, with the rock-shaft provided with the hand-lever and curved arm, the lifting-lever G, and curved link $i''$, of the draw-bar, constructed and arranged substantially as described, whereby the joint action of the operator and team may be employed to raise and lock the plow suspended, substantially as described.

NATHAN ELMER.

Witnesses:
  A. O. BEHEL,
  JAMES FERGUSON.